United States Patent [19]

Middleton, Jr.

[11] Patent Number: 4,756,580

[45] Date of Patent: Jul. 12, 1988

[54] ADJUSTABLE VIDEO MONITOR CABINET

[76] Inventor: Charles F. Middleton, Jr., 18 Ames Rd., Sudbury, Mass. 01776

[21] Appl. No.: 935,506

[22] Filed: Nov. 26, 1986

[51] Int. Cl.⁴ .............................................. F16M 11/24
[52] U.S. Cl. ..................................... 312/7.2; 312/251; 248/1 I; 248/188.2
[58] Field of Search .................. 312/233, 251, 7.1, 7.2; 248/1 B, 1 C, 1 I, 677, 676, 188.2; 280/43.1, 47.21

[56] References Cited

U.S. PATENT DOCUMENTS

| | | | |
|---|---|---|---|
| 1,424,934 | 8/1922 | Paterson | 248/188.2 X |
| 1,865,899 | 7/1937 | Gohmann | 248/188.2 |
| 2,414,506 | 1/1947 | Bowen | 248/676 X |
| 3,799,484 | 3/1974 | Muller et al. | 248/188.2 |
| 4,141,523 | 2/1979 | Brendgens | 248/188.2 X |
| 4,475,705 | 10/1984 | Henneberg et al. | 248/447.2 |
| 4,516,508 | 5/1985 | Kako et al. | 248/188.2 X |
| 4,518,142 | 5/1985 | Sulcek et al. | 248/188.2 |
| 4,527,766 | 7/1985 | Krenz | 248/1 I |
| 4,556,189 | 12/1985 | Kirpluck et al. | 248/1 I |
| 4,561,620 | 12/1985 | Goetz et al. | 248/1 T |

Primary Examiner—Joseph Falk
Attorney, Agent, or Firm—Hamilton, Brook, Smith & Reynolds

[57] ABSTRACT

The present invention relates to an adjustable cabinet which is particularly suited for supporting a video monitor. The adjustable cabinet rests on two foot pads and a pivotal support member. The support member comprises a wheel attached to an armature which is pivotally mounted to the cabinet for adjusting the viewing angle of the monitor.

11 Claims, 5 Drawing Sheets

ADJUSTABLE VIDEO MONITOR CABINET

BACKGROUND OF THE INVENTION

The present invention relates to an adjustable cabinet used for housing a computer video monitor which is typically a cathode ray tube (CRT).

Prior art video monitor cabinets typically consist of a housing for the monitor pivotally secured to a base. These cabinets allow the video monitor to tilt from its upright, vertical position and swivel about the base; however, they do not allow the cabinet to be easily moved about the work space.

DISCLOSURE OF THE INVENTION

The present invention relates to an adjustable cabinet which is particularly suited for supporting a video monitor used with computers. The adjustable cabinet comprises a cabinet housing which rests on two foot pads and a pivotal support member.

In accordance with the present invention, the pivotal support member is used to adjust the viewing angle of the monitor. The pivotal support member comprises a rolling element such as a wheel or ball secured to an armature which pivots about a pin secured to the housing. Preferably, the armature is hidden from the viewer by enclosing it within the housing.

In one embodiment of the invention, to lock the armature into its adjusted position, a guide, fixed to the armature, is fitted into one of a plurality of notches along an arced plate secured to the bottom of the housing. The plate serves as a control member to define a front to back path for the guide. Preferably, the notches are uniformly displaced along the arced plate. A handle attached to the armature is used for relocating the position of the guide.

Sliding the armature back and forth allows the viewing angle of the video monitor to be adjusted or tilted from its vertical, upright position. Preferably, the maximum forward tilt angle of the monitor is no more than five degrees from its vertical position and its backward adjusted tilt is no more than fifteen degrees from its vertical position. Restricting the adjusted viewing angle allows sufficient viewing flexibility while insuring stability of the monitor. Additionally, the cabinet can be easily moved forward and aft, into and out of the work space. Thus, the present invention eliminates the need for the viewer to physically adjust himself to the monitor.

In an alternative embodiment, the pivotal support comprises a ball assembly rotated about a pin secured to the bottom of the housing. A guide secured to the ball assembly follows along the bottom of the housing as adjustments are made. When an adjustment is made, the guide is fitted between ridges which lock the ball assembly into its adjusted position.

BRIEF DESCRIPTION OF THE DRAWINGS

The foregoing and other objects, features, and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present invention relates to an adjustable cabinet and is particularly suited to a video monitor housing used with computers.

Figure 1:
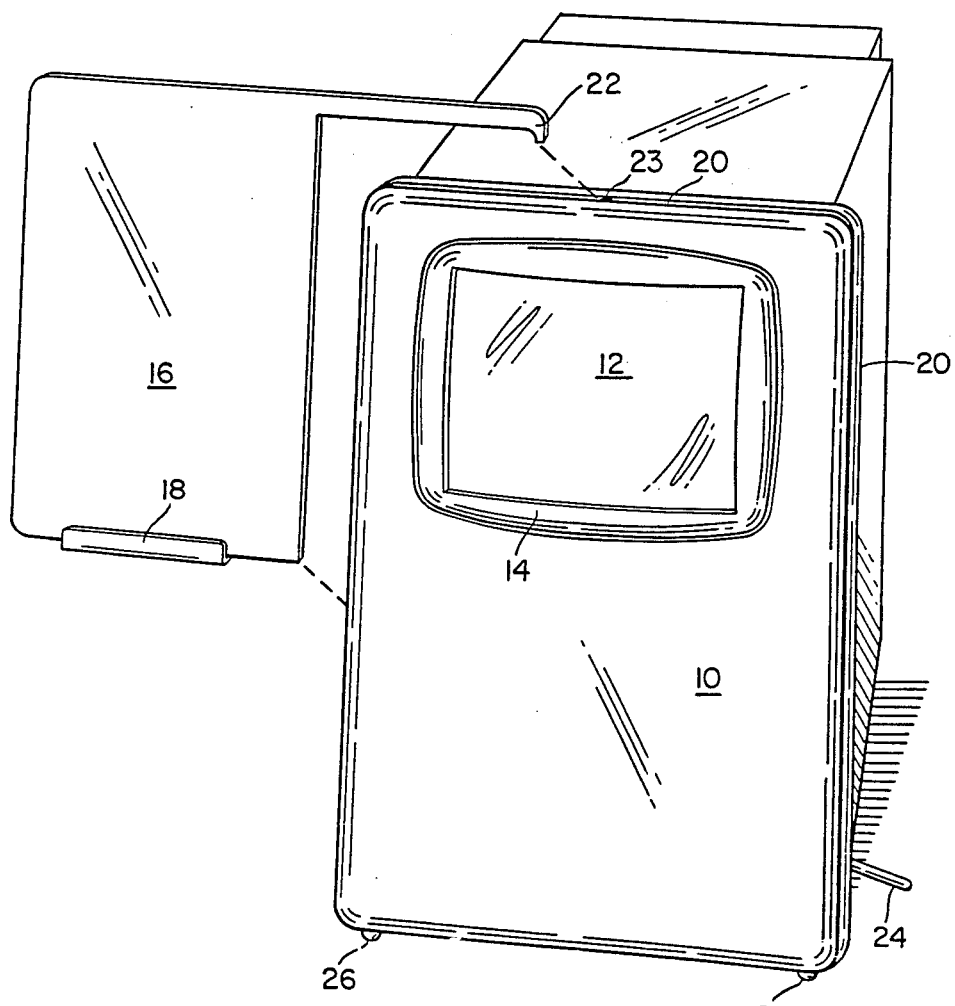
FIG. 1 is a perspective view of a video monitor housing.

In FIG. 1, a front perspective view of the video monitor housing 10 is shown. Located at the top of the housing 10 is a monitor screen 12 such as a cathode ray tube. A bezel 14 outlines the visual portion of the screen 12 and may come in variable sizes to accommodate different size screens. Located to the left of the monitor 10 is a typing rack 16 which has a mount 18 for holding work material. The rack 16 is secured to the housing 10 by grooves 20 along the top and sides of the front portion of the housing 10 (shown more clearly in FIG. 2). A notch 22 fitted into a slot 23 in the groove 20 at the top of the housing locks the rack 16 in place. A mount may be placed on the opposite side of the typing rack 16 to enable this rack to be conveniently reversed and used on the right side of the housing 10. Alternatively, a second typing rack (not shown) might be provided in conjunction with the first to increase the available work space. A handle 24 for adjusting the viewing angle of the video monitor is located at the bottom right hand side of the housing 10. This handle may also be installed to accomodate left hand operation.

Figure 2:
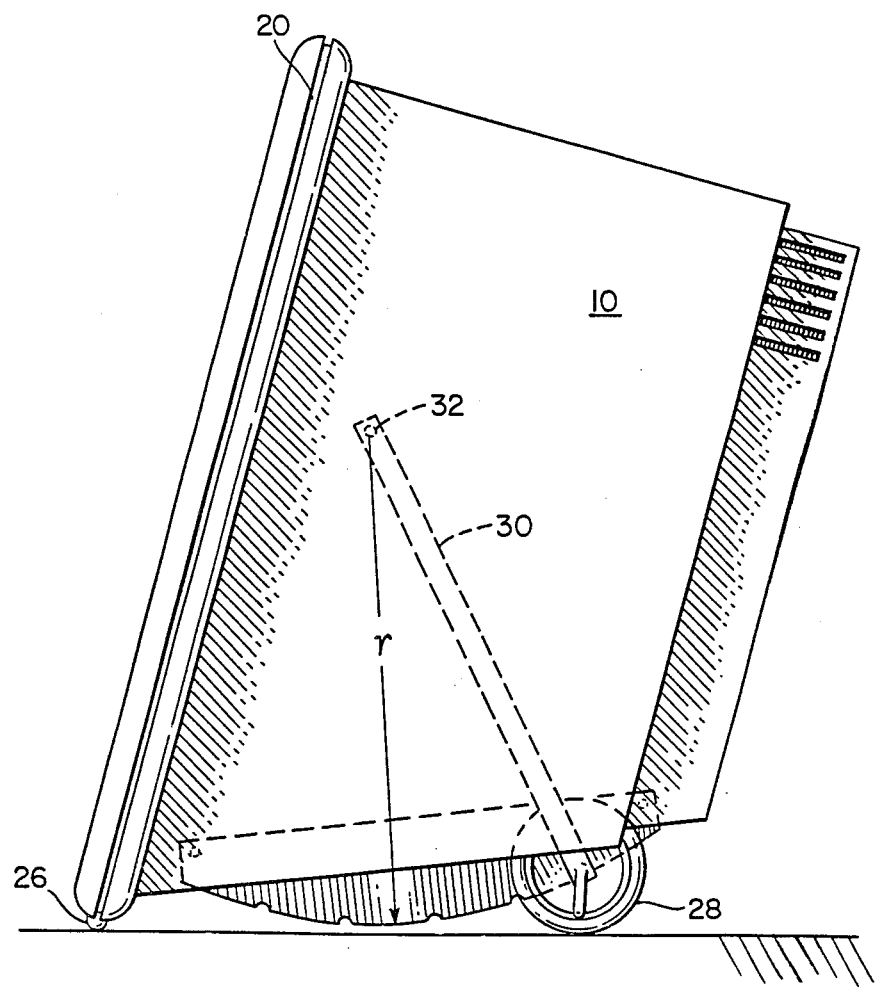
FIG. 2 is a side view of the video monitor housing shown in FIG. 1 embodying the present invention.

In its resting position, the weight of the cabinet is distributed between two foot pads 26 located at the bottom front of the housing 10 and a wheel 28 connected to a pivoting armature 30 as shown in FIG. 2. Thus, the foot pads 26 and the armature 30 with the wheel 28 attached form a tripod configuration which stabilizes and supports the housing 10. Preferably, the armature 30 is pivotably secured to one side of the housing by a pin 32 and is enclosed by the housing as indicated by the phantom lines shown in FIGS. 2 and 3. As an alternative, a pivoting armature may be mounted on both sides of the housing (not shown) for more support.

Figure 3:
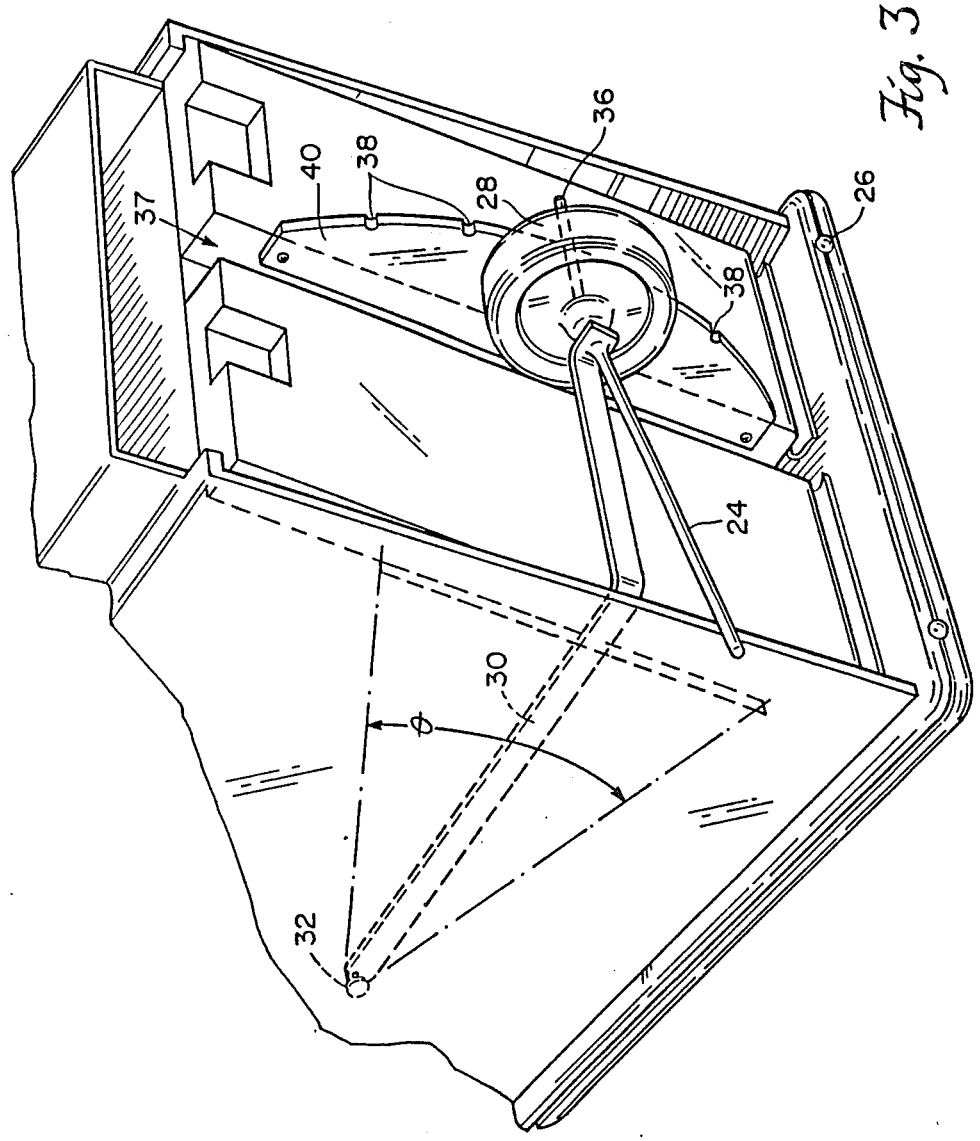
FIG. 3 is a partial perspective view of the bottom of the video monitor housing, shown in FIG. 1.

As indicated by FIG. 3, a guide 36, secured to the armature 30, has been selectively fitted into a notch 38 along an arced plate 40. The arced plate 40 is secured to the bottom of the housing 10. Preferably the guide 36 is biased against the arced plate 40 by allowing the curvature of the arced plate to be slightly greater than the arc formed by the guide 36 when the armature 30 pivots about the pin 32. Biasing the guide against the plate, along with the weight of the cabinet, helps the guide 36 to be firmly fitted into a selected notch. Preferably five notches 38 are uniformly distributed along the arced plate to allow the cabinet's and minimum tilt position to be adjusted between a 5 degree forward tilt and a 15 degree backward tilt relative to the cabinet's upright vertical position.

With different users sharing the same work station, the viewing angle of the monitor screen must be constantly adjusted for each user to allow for proper viewing. With the present invention, the monitor's viewing angle can easily be adjusted by pulling the top of the monitor cabinet 10 towards the viewer and onto the foot pads 26. Preferably the foot pads 26 are made of high friction material such as rubber or felt to prevent the cabinet from sliding on a work station's surface area. The position of the wheel 28 may then be moved back and forth along a wheel housing 37 by slightly pulling on the handle 24 causing the armature 30 to bend away from the arced plate 40 to release the guide 36 from the notch 38. The guide may then be locked into another notch by releasing the handle.

Unlike conventional monitor cabinets, the present invention also allows the cabinet 10 to be rotated about the whel 28 or to be slid to a more favorable position within the work area. By applying a small amount of lifting force to the front of the cabinet at the foot pads 26 the majority of the cabinet's weight can be shifted to the wheel 28. With a majority of the weight on the wheel 28, the cabinet can easily be slid back and forth as well as rotated about the wheel 28. Thus, either extra space or a relocation of the viewing distance can easily be accomplished with the present invention. In conventional monitor cabinets the viewer must physically adjust his viewing distance to the screen.

Figure 4:
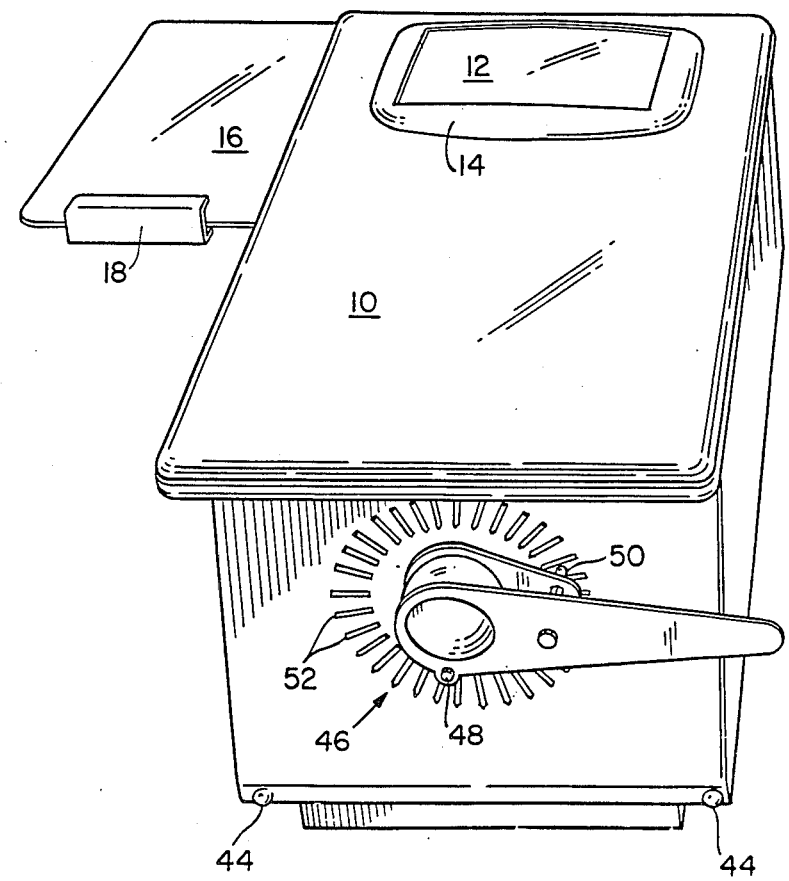
FIG. 4 is a perspective view of an alternative embodiment of a video monitor housing.

A perspective bottom view of an alternative embodiment is shown in FIG. 4. In this embodiment the monitor housing 10 again rests on a tripod configuration comprising two foot pads 44 located at the back of the housing 10 and a ball assembly 46. The viewing angle of the monitor can be adjusted by rotating the ball assembly 46 about a pin 48 secured to the bottom of housing 10. To lock the ball assembly 46 in a selected position, a guide 50 which follows along the bottom of the housing 10 is trapped between any two of a plurality of ridges 52 placed along the path of the guide 50. Preferably the guide 50 is made of durable material such as nylon.

Figure 5:
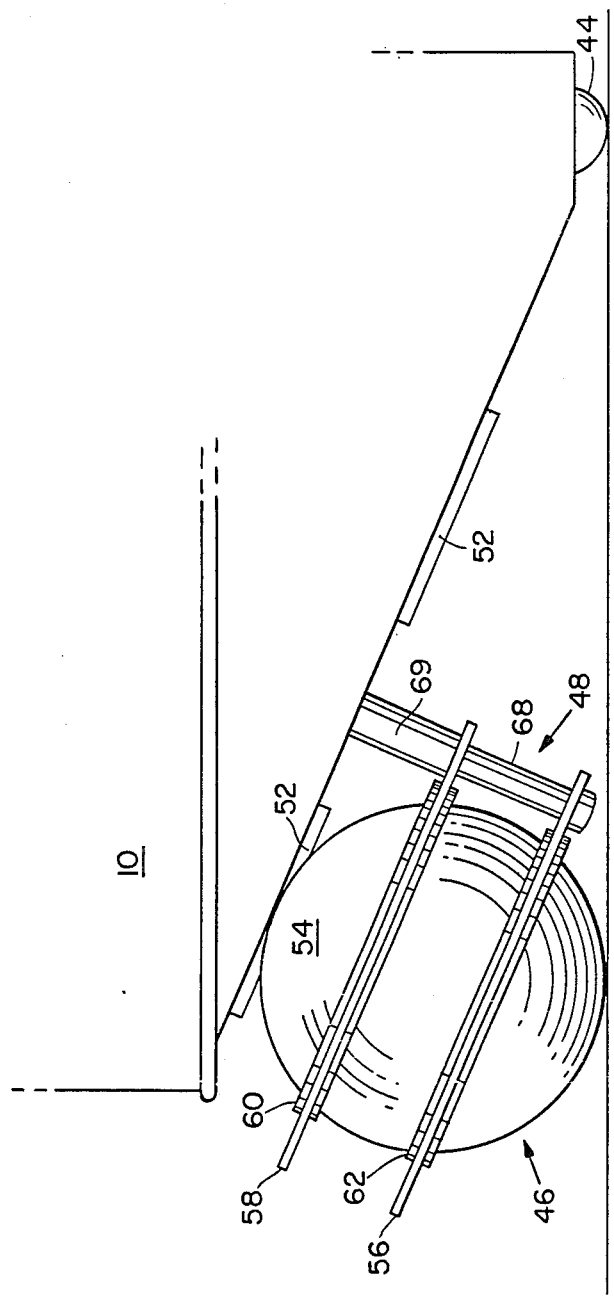
FIG. 5 is a partial side view of the video monitor housing shown in FIG. 4.

FIG. 5 shows a side view of this embodiment at a maximum forward tilt. A maximum backward tilt is achieved by rotating the ball assembly 180 degrees. Again, it is preferred that the maximum forward tilt of the cabinet relative to its vertical, upright position is 5 degrees forward and 15 degrees backwards.

Figure 6:
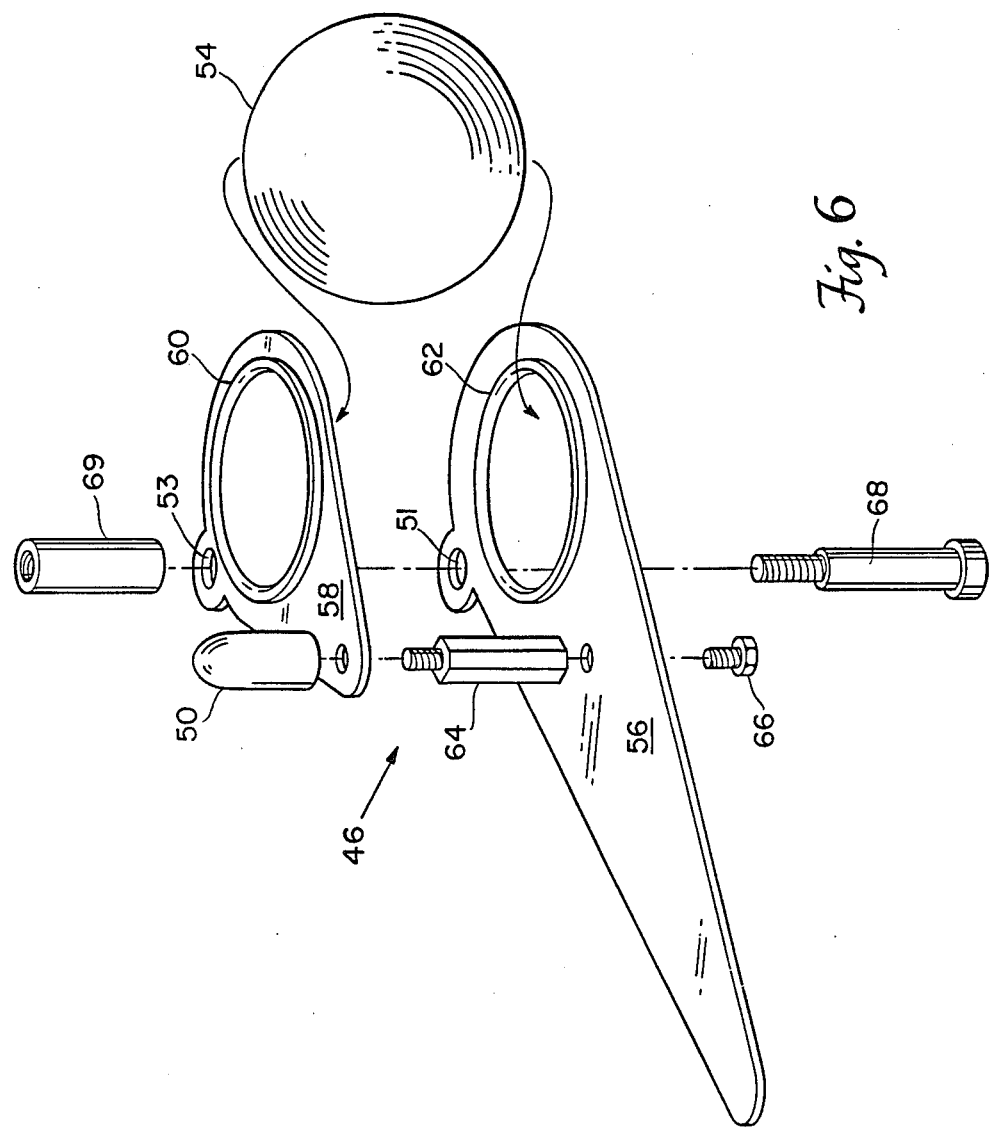
FIG. 6 is an exploded view of a ball assembly embodied in FIG. 4.

FIG. 6 shows an exploded view of this ball assembly 46. As shown, a ball 54 is secured between two plates 56 and 58 having holes with diameters less than that of the ball 54. Grommets 60 and 62, made of material such as nylon, are fitted around the perimeter of these holes to serve as a bearing race when the ball 54 rolls along a work surface. The plates 56 and 58 are held together by a male/female standoff 64 secured at one end by a screw 66 and at the other end by the guide 50. Adjacent to the ball 54, a shoulder screw 68 which secures the ball assembly 46 to the cabinet housing 10 is fitted through concentric holes 51 and 53 in the plates and a spacer 69. The shoulder screw 68 should be large enough to insure a tight fit through the holes 51 and 53 while allowing the plates to rotate about its shoulder.

Figure 7:
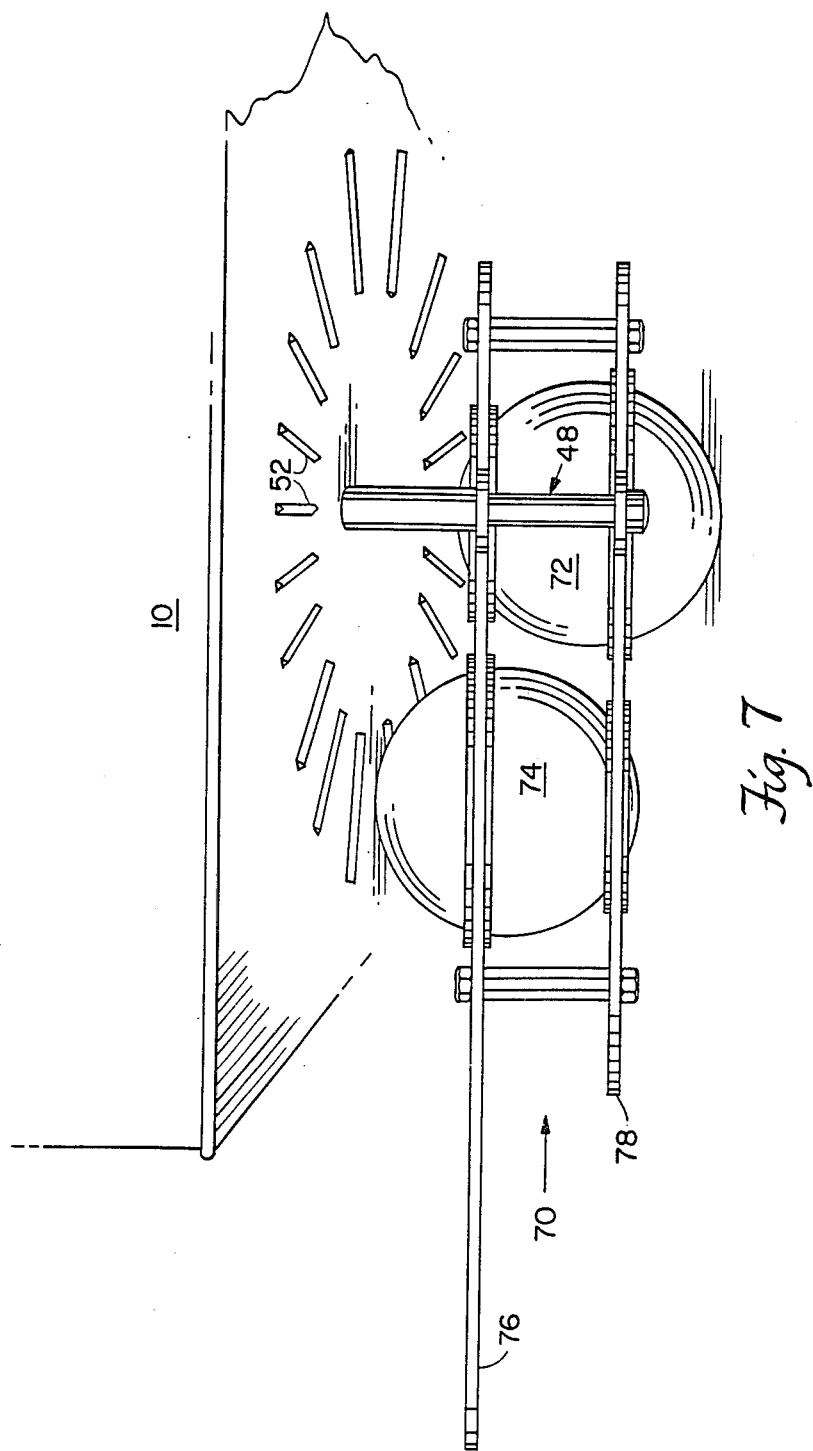
FIG. 7 is an alternative embodiment of the ball assembly.

An alternative ball assembly 70 is shown in FIG. 7. As shown, this assembly comprises two balls 72 and 74 secured between two plates 76 and 78 such that the first ball 72 rolls along the work surface and the second ball 74 rolls along the bottom surface of the housing 10. Preferably, the first ball 72 rolling on the work surface rotates closely about the pin 48 to allow for suitable adjustment without shifting the weight of the monitor housing 10 too far to one side and thus creating a state of instability.

Figure 8:
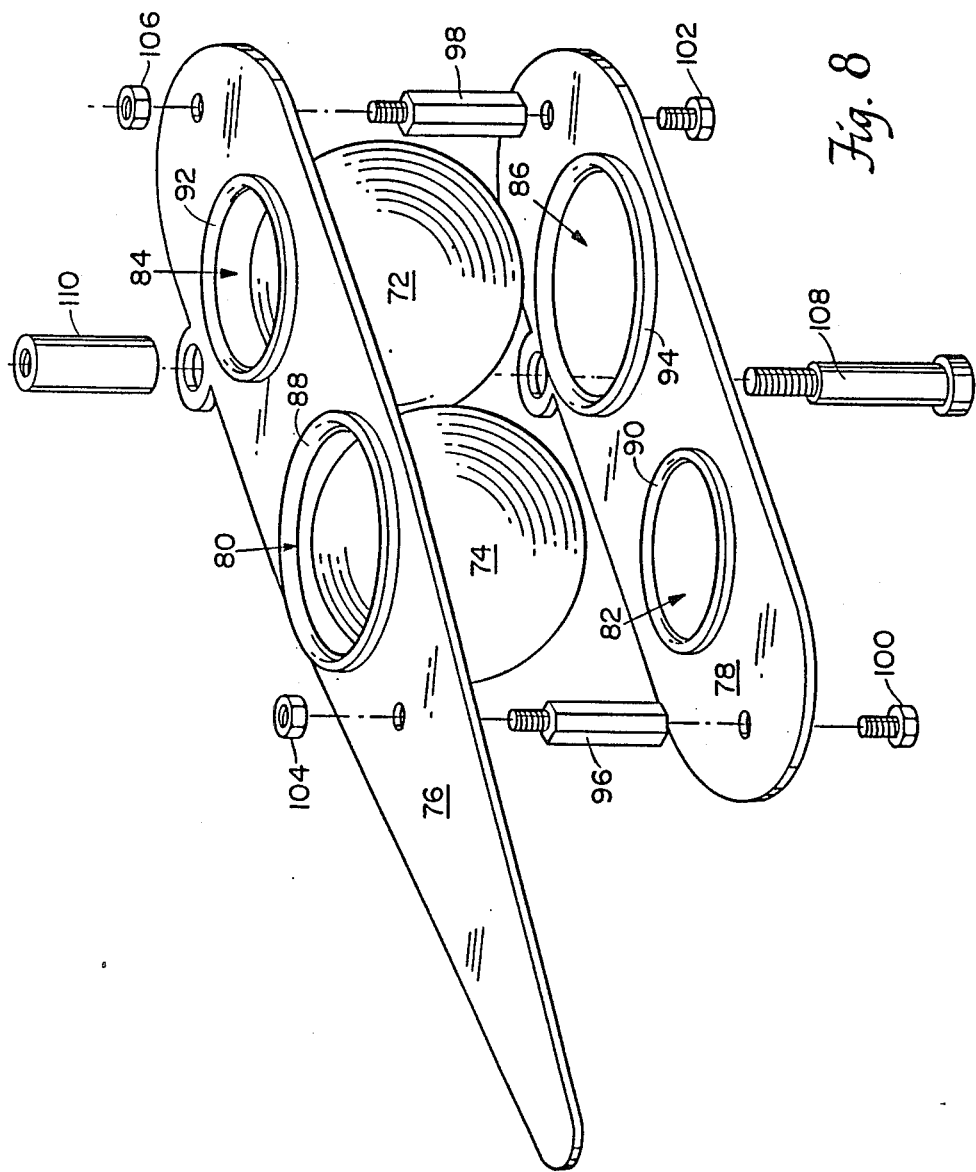
FIG. 8 is an exploded view of the ball assembly shown in FIG. 7.

As exploded view of this alternative ball assembly 70 is shown in FIG. 8. From this view, it can be seen that the two balls 72 and 74 are secured between two plates 76 and 78 having two pairs of concentric holes 80–86 with different diameters. With this construction, a larger portion of the ball is allow to fit through the plates on the side adjacent to its rolling surface. Grommets 89–94 are again used for bearing races. The assembly is held together by a pair of male/female standoffs 96 and 98 secured at one end by screws 100 and 102 and at the other by nuts 104 and 106. The assembly 70 rotates about a sholder screw 108 which fastens to the housing 10 through a spacer 110.

As before, adjustment of the viewing angle of the monitor screen can easily be accomplished by shifting weight of the monitor to the foot pads. The ball assembly can then be rotated by applying a small bending moment to the plates to allow either the guide 50 as shown in FIG. 5 or the second ball 74 of FIG. 7 to clear the edges of the ridges 52 which lock it in place.

Thus, the present invention provides for an adjustable cabinet which is easy to use and which allows more adjustment flexibility than conventional monitor cabinets. Further, the present invention is easier and cheaper to manufacture because it requires less parts.

While the invention has been particularly shown and described with reference to preferred embodiments thereof, it will be understood by those skilled in the art that various changes in form and details may be made without departing from the spirit and scope of the invention as defined in the appended claims. For example, the wheel shown in FIGS. 2 and 3 could be replaced with a ball and socket assembly attached to the armature. Also, rather than ridges formed in the bottom of the housing as shown in FIG. 4, pits or other forms of depressions could be used to lock the ball assembly to a desired, adjusted position.

I claim:

1. An adjustable cabinet comprising:
   a video monitor;
   a cabinet housing the video monitor and having a pivot on a bottom surface such that the bottom surface can be positioned at any of a plurality of angles with respect to a work surface;
   an adjustable support assembly for adjusting the angle of the housing relative to the work surface comprising a ball secured between two plates which rotate in a plane parallel to the housing bottom about a pin fixed to the bottom such that the ball rolls along the work surface towards and away from the pivot to increase or decrease the angle; and
   means for locking the support assembly in a plurality of selected positions.

2. An adjustable cabinet as claimed in claim 1 wherein the forward angle of adjustment of the cabinet relative to the cabinet's upright vertical position is no more than five degrees and the backward angle is no more than fifteen degrees.

3. An adjustable cabinet as claimed in claim 1 wherein the means for locking the support assembly comprises:
   a guide secured to the adjustable support assembly; and notches formed in the bottom of the housing for securing the guide to a fixed adjusted position.

4. An adjustable cabinet as claimed in claim 1 wherein the adjustable support assembly for adjusting the housing comprises a second ball secured between the two plates such that the first ball rolls along the surface of the work surface and the second ball rolls along the bottom surface of the cabinet housing.

5. An adjustable housing for a video monitor comprising:
   a cabinet housing having a bottom, front and back sides, and a pivot contacting a support surface such that the cabinet can be positioned at any of a plurality of angles and pivots relative to the support surface;
   a control member secured to the housing bottom defining a front-to-back path;
   a support member running along the path of the control member toward and away from the pivot to adjust the angle of the housing relative to the support surface; and
   means for locking the support member relative to the control member in a plurality of selected positions.

6. An adjustable housing for a video monitor as defined in claim 5, wherein said locking means is comprised of a plurality of notches positioned on the control member from front to back to secure the support member.

7. An adjustable housing for a video monitor as defined in claim 5 wherein said support member comprises a wheel that is in rolling contact with the support surface.

8. An adjustable housing for a video monitor comprising:
   a cabinet housing; and
   pivotal support means to adjust the angle of the housing relative to a support surface, said pivotal support means comprising a rolling ball secured to the housing by a ball support assembly rotatable about a pin secured to the bottom of the housing, a guide moveable along a path on the housing and secured to the ball support assembly, and ridges formed along the path of the guide as the ball assembly rotates about the pin for locking the ball assembly to an adjusted position.

9. An adjustable housing for a video monitor comprising:
   a cabinet housing;
   pivotal support means for adjusting the angle of the housing relative to a support surface, said pivotal support means comprising a ball support assembly which pivots about a pin secured to the housing and having a first ball for rolling along the support surface and a second ball fixedly related to the first ball for rolling along a bottom surface of the cabinet as the ball assembly is rotated about the pin;
   locking means for locking the pivotal support means in a plurality of selected positions.

10. An adjustable housing as claimed in claim 9 further comprising ridges formed on the bottom of the housing for locking the second ball in an adjusted position.

11. An adjustable cabinet comprising:
    a video monitor;
    a cabinet housing the video monitor such that the cabinet is adjustable to permit viewing of the monitor in a plurality of viewing angles;
    a pivotal armature secured to the housing for adjusting the viewing angle of the video monitor;
    a guide attached to the armature; and
    an arched plate, secured to the housing, having at least one notch along the arc for securing the guide to an adjusted position.

* * * * *